(12) United States Patent
Rossato et al.

(10) Patent No.: US 10,504,246 B2
(45) Date of Patent: *Dec. 10, 2019

(54) DISTINCT ENCODING AND DECODING OF STABLE INFORMATION AND TRANSIENT/STOCHASTIC INFORMATION

(71) Applicant: V-NOVA INTERNATIONAL LIMITED, Paddington (GB)

(72) Inventors: Luca Rossato, Milan (IT); Guido Meardi, Milan (IT)

(73) Assignee: V-NOVA INTERNATIONAL LIMITED, Paddington (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,883

(22) Filed: Mar. 15, 2017

(65) Prior Publication Data

US 2017/0186187 A1 Jun. 29, 2017

Related U.S. Application Data

(63) Continuation of application No. 13/744,808, filed on Jan. 18, 2013, now Pat. No. 9,626,772.

(60) Provisional application No. 61/587,989, filed on Jan. 18, 2012.

(51) Int. Cl.
*G06K 9/36* (2006.01)
*G06K 9/46* (2006.01)
*G06T 9/00* (2006.01)
*H04N 19/46* (2014.01)
*H04N 19/37* (2014.01)

(52) U.S. Cl.
CPC .............. *G06T 9/00* (2013.01); *H04N 19/37* (2014.11); *H04N 19/46* (2014.11)

(58) Field of Classification Search
None
See application file for complete search history.

(56) References Cited

U.S. PATENT DOCUMENTS 3,703,727 A 11/1972 Knowlton
5,321,520 A * 6/1994 Inga ..................... H04N 1/2179
358/1.9

(Continued)

FOREIGN PATENT DOCUMENTS

EP 1662802 A1 8/2004
EP 1511319 A1 3/2005

(Continued)

OTHER PUBLICATIONS

Cristina Gomila and Alexander Kobilansky, "Sei Message for film grain encoding", Joint Video Team (JVT) Jun. 29, 2012, pp. 1-12.

(Continued)

*Primary Examiner* — Feng Niu
(74) *Attorney, Agent, or Firm* — Workman Nydegger

(57) ABSTRACT

A method and a signal processor for receiving a data stream comprising at least two distinct sets of encoded data, at least one set of which is relative to transient/stochastic components of a signal. Based at least in part on the distinct sets of encoded data, the signal processor decodes and reconstructs a corresponding rendition of signal for each set of the encoded data. The distinct sets of renditions of signal are then combined into a single rendition of reconstructed signal.

18 Claims, 9 Drawing Sheets

(56) References Cited

U.S. PATENT DOCUMENTS

| | | | | |
|---|---|---|---|---|
| 5,384,643 | A * | 1/1995 | Inga | G06F 19/321 358/1.9 |
| 5,416,602 | A * | 5/1995 | Inga | G06F 19/321 358/1.9 |
| 6,377,624 | B1 * | 4/2002 | Keesman | H04N 5/9264 348/385.1 |
| 6,587,505 | B1 | 7/2003 | Nozawa et al. | |
| 6,798,834 | B1 * | 9/2004 | Murakami | H04N 19/105 375/240.12 |
| 6,853,682 | B2 | 2/2005 | Min | |
| 7,020,335 | B1 * | 3/2006 | Abousleman | G06K 9/3241 375/240.11 |
| 7,079,692 | B2 * | 7/2006 | Lan | H04N 19/176 375/E7.145 |
| 7,266,575 | B2 * | 9/2007 | Ikeda | G06F 7/588 708/250 |
| 7,583,804 | B2 | 9/2009 | Suzuki et al. | |
| 7,623,738 | B2 | 11/2009 | DeHaan | |
| 7,634,290 | B2 | 12/2009 | Kelton et al. | |
| 7,684,626 | B1 | 3/2010 | Cote et al. | |
| 7,738,722 | B2 | 6/2010 | Gomila et al. | |
| 7,882,134 | B2 * | 2/2011 | Pattabhi | G06F 16/217 707/791 |
| 7,889,248 | B2 * | 2/2011 | Kawashima | G06T 5/002 348/208.99 |
| 7,898,951 | B2 * | 3/2011 | Koba | H04N 21/2365 370/232 |
| 8,139,648 | B2 * | 3/2012 | Murayama | H04N 19/46 375/240.27 |
| 8,265,140 | B2 | 9/2012 | Mehrotra | |
| 8,275,609 | B2 * | 9/2012 | Wang | G10L 25/78 704/214 |
| 8,295,350 | B2 * | 10/2012 | Murakami | H04N 19/105 375/240.12 |
| 8,325,800 | B2 * | 12/2012 | Holcomb | H04N 19/147 375/240.03 |
| 8,332,651 | B2 * | 12/2012 | Ghouti | H04L 9/0844 713/183 |
| 8,379,851 | B2 * | 2/2013 | Mehrotra | H04L 65/607 380/200 |
| 8,406,290 | B2 * | 3/2013 | Li | H04N 19/37 360/64 |
| 8,681,878 | B2 * | 3/2014 | Murayama | H04N 19/46 375/240.27 |
| 8,982,963 | B2 * | 3/2015 | Gish | G06T 5/50 345/590 |
| 9,047,496 | B1 * | 6/2015 | Widdowson | G06K 9/00 |
| 9,076,434 | B2 | 7/2015 | Yamanashi | |
| 9,247,244 | B2 * | 1/2016 | Li | H04N 19/37 |
| 9,407,875 | B2 * | 8/2016 | Armstrong | H04L 63/0428 |
| 9,626,772 | B2 * | 4/2017 | Rossato | H04N 19/46 |
| 2003/0128970 | A1 | 7/2003 | Lan et al. | |
| 2005/0036550 | A1 * | 2/2005 | Koba | H04N 21/2365 375/240.12 |
| 2005/0065824 | A1 * | 3/2005 | Kohan | G06Q 10/10 705/3 |
| 2006/0051072 | A1 * | 3/2006 | Boroczky | G11B 27/034 386/232 |
| 2006/0114998 | A1 | 6/2006 | Barrau | |
| 2006/0140278 | A1 | 6/2006 | Gomila et al. | |
| 2006/0256853 | A1 * | 11/2006 | Schlockermann | H04N 19/50 375/240.03 |
| 2006/0270433 | A1 | 11/2006 | Kelton et al. | |
| 2007/0014484 | A1 * | 1/2007 | MacInnis | H04N 19/172 382/275 |
| 2007/0058866 | A1 | 3/2007 | Boyce et al. | |
| 2008/0144821 | A1 * | 6/2008 | Armstrong | H04L 63/0428 380/216 |
| 2008/0306736 | A1 * | 12/2008 | Sanyal | G10L 19/0019 704/233 |
| 2009/0010623 | A1 * | 1/2009 | Date | G11B 27/034 386/335 |
| 2009/0027548 | A1 * | 1/2009 | Winger | G06T 3/4084 348/441 |
| 2009/0125636 | A1 | 5/2009 | Li | |
| 2010/0064314 | A1 | 3/2010 | Li et al. | |
| 2010/0287402 | A1 * | 11/2010 | Kim | H04J 3/067 713/400 |
| 2011/0103445 | A1 | 5/2011 | Jax et al. | |
| 2012/0063597 | A1 * | 3/2012 | Tropp | H04L 9/12 380/259 |
| 2012/0070127 | A1 * | 3/2012 | Armstrong | H04L 63/0428 386/252 |
| 2013/0124201 | A1 | 5/2013 | Yamanashi et al. | |
| 2016/0337692 | A1 * | 11/2016 | Armstrong | H04L 63/0428 |

FOREIGN PATENT DOCUMENTS

| | | |
|---|---|---|
| EP | 1814333 A1 | 9/2005 |
| JP | 2005-080301 | 8/2004 |
| JP | 2006-115380 | 4/2006 |
| JP | 2007-508788 | 4/2007 |
| JP | 2008-011177 | 1/2008 |
| JP | 2008-518510 | 5/2008 |
| JP | 2010-041654 | 2/2010 |
| WO | 2006047138 A2 | 5/2006 |
| WO | 2013011492 A2 | 1/2013 |

OTHER PUBLICATIONS

Martin Schlockermann, et al. "Film Grain Coding in H.26 4/AVC", Joint Video Team (JVT), Jun. 29, 2012, pp. 1-6.
Office Action, Patent No. 2014-552737, dated Jun. 12, 2017, pp. 3.
Cee Y-K, "Survey of Progressive Image Transmission Methods", International Journal of Imaging Systems and Technology, Wiley and Sons, New York, US, vol. 10, No. 1. Jan. 1, 1999 (Jan. 1, 1999), pp. 3-19, XP000805935, ISSN: 0899-9457, DOI: 10.1002/(SICI) 1098-1098 (1999) 10:1 3::AID-IMA23.0.CO;2-E.
Mian S H: "Analysis of MPEG-4 scalable encoded video—Internet protocols, technology and applications (VoIP)", IEE Proceedings: Communicati, Institution of Electrical Engineers, GB, vol. 151, No. 3, Jun. 25, 2004 (Jun. 25, 2004), pp. 270-279, XP006021972, ISSN: 1350-2425, DOI: 10.1049/IP-COM:20040299.
Consultation from European Patent Office, application No. 13 708 525.4-1208, dated Feb. 19, 2018, pp. 3.
Oh, B.T., et al., "Advanced Film Grain Noise Extraction and Synthesis for High-Definition Video Coding", IEEE Transactions and Circuits and Systems for Video Technology, 19(12): 1717-1729 (2009).
International Search Report for PCT/IB2013/050486; dated Jul. 17, 2013; 3 pages.

* cited by examiner

DISTINCT ENCODING AND DECODING OF STABLE INFORMATION AND TRANSIENT/STOCHASTIC INFORMATION

RELATED APPLICATIONS

This application is a continuation of U.S. patent application Ser. No. 13/744,808 entitled "DISTINCT ENCODING/DECODING OF STABLE/PREDICTABLE INFORMATION AND TRANSIENT/STOCHASTIC INFORMATION", filed on Jan. 18, 2013, the entire teachings of which are incorporated herein by this reference.

U.S. patent application Ser. No. 13/744,808 is related to and claims the benefit of U.S. patent application Ser. No. 61/587,989 entitled "DISTINCT ENCODING/DECODING OF STABLE/PREDICTABLE INFORMATION AND TRANSIENT/STOCHASTIC INFORMATION", filed on Jan. 18, 2012, the entire teachings of which are incorporated herein by this reference.

This application is related to earlier filed U.S. patent application Ser. No. 13/352,944 entitled "SIGNAL ANALYSIS AND GENERATION OF TRANSIENT INFORMATION,", filed on Jan. 18, 2012, the entire teachings of which are incorporated herein by this reference.

This application is related to earlier filed U.S. patent application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION,", filed on Nov. 23, 2011, the entire teachings of which are incorporated herein by this reference.

This application is also related to U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference.

This application is related to U.S. patent application Ser. No. 13/188,201 entitled "TIERED SIGNAL DECODING AND SIGNAL RECONSTRUCTION,", filed on Jul. 21, 2011, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY,", filed on Jul. 21, 2011, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY,", filed on Jul. 21, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY," filed on Jul. 21, 2011, the entire teachings of which are incorporated herein by this reference.

BACKGROUND

It happens very often that a digitized signal features several subsequent samples of a same underlying information (which by way of non-limiting examples might be a 2D image, a 3D volumetric image, or even a plane of elements featuring more than three dimensions), creating a multi-dimensional signal (e.g., by way of non-limiting examples a 3D signal representing a sequence of subsequent 2D images, or a 4D signal representing a sequence of 3D/volumetric images, etc.) where for one of its dimensions, such as the time dimension there is some degree of signal stability over several subsequent samples. Non-limiting real-life examples would be subsequent slices in a Computer Tomography scan, subsequent volumetric images in a MRI scan, subsequent frames in motion pictures, etc.

Due to the nature of real-life sensors and of transmission channels, it is very likely that different samples of similar or even same underlying information will feature different characteristics. For instance, a specific sample might feature slightly different values of a same underlying information than previous and/or subsequent samples due to motion blur that is not present in other samples, or to slightly different radiation intensities or light conditions at the time of sampling, or to thermal noises in the sensor, or to transmission errors in a channel, or to other types of noises, etc. The end result is a higher statistical variability of the signal elements than it would be desirable. This generates large amounts of information (e.g., unnecessary intensity/color variations, plane elements of the wrong color, etc.) that are hard to distinguish from the "real" and necessary details in the signal, and that can complicate further signal processing (e.g., motion estimation, content identification, encoding/decoding, etc.). In addition, such variations discourage the use of quantization with relatively large quantization steps, as it would limit the possibility to adequately represent the subtle variations of relatively stable information from one element to the next.

Several existing signal processing methods include separating stable/relevant information ("core signal") from transient/stochastic information ("transient layer signal") before encoding/decoding a signal. Stable information is usually detailed and can typically be at least in part predicted from neighboring samples. In contrast, transient information is typically unpredictable from the transient information of neighboring samples.

Several existing conventional methods are aimed at filtering/decreasing/toning down transient layer components of a signal and thus, among other things, improving the efficiency of data compression since the amount of information entropy of transient information tends to be higher than that of stable information. The problem with those methods is that in some situations a decoded signal with limited noise and/or limited transient components is perceived by users as a signal with limited fidelity to the original, since real signals do feature a certain amount of transient elements. In other words, a certain degree of transient/stochastic elements is desirable in the reconstructed signal.

Another characteristic of conventional approaches is that transient layer elements, when not being filtered out entirely, are encoded along with the core signal components, with the same signal encoding methods, and thus encoding details more than necessary.

SUMMARY OF THE INVENTION

Embodiments herein relate to signal processing, and more particularly to encoding and decoding of multidimensional signals.

Embodiments herein deviate with respect to conventional systems and methods, providing new and unique methods to encode and decode both the stable information of a signal ("core signal") and its transient/stochastic components ("transient layer signal").

The innovative and unique approaches described herein allow separation of the signal into two different sets of information (such as a core signal and transient layer signal), and then encoding and decoding the two sets of information independently. In this way, very different encoding/decoding approaches can be applied to the core signal, which requires a reconstruction scheme with strict adherence to the original signal, and to the transient layer signal, which typically requires a reconstruction scheme with just the same stochastic properties, but not necessarily identical to the transient layer contained in the original signal.

In addition, in case of network congestion, embodiments described herein allow reduction of bitrates required to transmit a rendition of the signal by independently modulating the necessary bitrates for the core signal and for the transient layer signal. For example, higher priority can be given for transmitting the core signal, and thus allowing smoother quality degradation compared to approaches where encoding of signal does not involve distinguishing the core signal component from the transient layer signal.

One embodiment herein includes a method for adjusting a first decoded rendition of a signal by combining it with information reconstructed based at least in part on received parameters corresponding to statistical properties of the signal, thus increasing the perceived quality of said decoded rendition.

More specifically, in a non-limiting example embodiment, a signal processor configured as a decoder receives two sets of reconstruction data. The first set of reconstruction data is decoded according to a first decoding method, reconstructing a first rendition of the signal ("core signal layer"). The second set of reconstruction data is decoded according to a second decoding method (different from the first decoding method), reconstructing a second rendition of the signal ("transient layer"). The decoder then combines the two renditions, obtaining a final rendition of the signal.

In some non-limiting embodiments, said second set of reconstruction data comprises at least one parameter corresponding to statistical properties of the signal. In other non-limiting embodiments, said second rendition of the signal is reconstructed also based at least in part on the quantization parameters used to decode said first rendition of the signal, effectively randomizing quantization errors via dithering.

In other non-limiting embodiments, the decoder reconstructs said second rendition of the signal according to a method that simulates the generation of values according to random generation of numbers, while leveraging information that is known at both encoder side and decoder side (i.e., allowing the encoder to precisely simulate the results of the reconstruction of the second rendition of the signal at the decoder side).

In a further non-limiting embodiment, the decoder simulates the random generation of numbers based on one or more reference tables of numbers, selecting a starting position in the table according to parameters that are available at both the encoding and the decoding side.

In other non-limiting embodiments, the decoder receives a parameter corresponding to the reference table that should be used for the generation of random numbers or seemingly random numbers, as well as one or more parameters corresponding to alterations to perform on such numbers (e.g., variation of intensity according to a scaling parameter, thus simulating a random number generation with a given statistical distribution and a given standard deviation).

In other non-limiting embodiments, within the second set of reconstruction data the decoder receives different parameters corresponding to different portions of the signal, and correspondingly reconstructs the second rendition of the signal according to different reference tables and different operations based on the portion of the signal. In a non-limiting embodiment, this is achieved by receiving an auxiliary map of parameters (indicating a parameter value for each given portion of a signal), and then—for each portion—reconstructing the second rendition of the signal based at least in part on the corresponding parameter.

These and other embodiment variations are discussed in more detail below.

As mentioned above, note that embodiments herein may be implemented in software or hardware, or a combination of both, and can include a configuration of one or more computing devices, encoder devices, decoder devices, processor devices, routers, network, workstations, handheld or laptop computers, set-top boxes, etc., to carry out and/or support any or all of the methods and/or operations disclosed herein. In other words, one or more computerized devices or processors can be programmed and/or configured to operate as explained herein to implement different embodiments.

In addition to the techniques as discussed above, yet other embodiments herein include software programs to perform the steps and operations summarized above and disclosed in detail below. One such embodiment comprises a non-transitory computer readable media including computer program logic, instructions, etc., encoded thereon in such a way that, when performed in a computerized device having a processor and corresponding memory and/or programs, causes the processor to perform any of the operations disclosed herein. Such arrangements can be provided as software, and/or in the forms of code, and/or other data (e.g., data structures) arranged or encoded on a computer readable medium such as an optical medium (e.g., CD-ROM, or DVD-ROM), floppy or hard disk or any other medium capable of storing computer readable instructions such as firmware or microcode in one or more ROM or RAM or PROM chips or as an Application Specific Integrated Circuit (ASIC). The software or firmware or any other such configurations can be installed in a computerized device and cause said computerized device to perform the techniques and/or operations as explained herein.

Accordingly, one particular embodiment of the present disclosure is directed to a computer program product that includes a computer-readable hardware storage medium having instructions stored thereon for supporting signal processing operations. The sequence of the steps has been added for clarity sake. It is to be noted that these steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that encode, decode and process signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

BRIEF DESCRIPTION OF THE DRAWINGS

The foregoing and other objects, features, and advantages of the invention will be apparent from the following more particular description of preferred embodiments, as illustrated in the accompanying figures in which like reference characters refer to the same parts throughout the different views.

DETAILED DESCRIPTION OF EMBODIMENTS

Methods illustrated herein are suitable for any type of multi-dimensional signals, including without limitation sound signals, multichannel sound signals, pictures, two-dimensional images, video signals, multi-view video signals, 3D video signals, volumetric signals, volumetric video signals, medical imaging signals, signals with more than four dimensions, etc.

For simplicity, along the description the illustrated embodiments usually adopt the use case of a video sequence made of a sequence of 2D images (commonly called "frames", or "fields" in the case of interlaced video signals), with each element (in such non-limiting example case typically referred to as "pixel", or as "plane element" or "pel") being characterized by a set of color settings in a suitable color space (e.g., YUV, RGB, HSV, etc.). However, the same concepts are not limited to time-based signals, but applicable to any other types of multi-dimensional signal in which at least one dimension T is suitable for a stability hypothesis. In essence, the signal is assumed to have a certain degree of predictability along the dimension T. For the dimensions which are not appropriate for performing stability hypothesis, it is assumed that losing detailed information is undesirable, even if the information is very local and/or non-correlated with other portions of the signal along those dimensions (e.g., by means of non-limiting example, a random dot on a white background that stays in the picture for only one frame is considered to be a statistical fluctuation with limited importance, while a similar random dot that stays in the picture for 20 consecutive frames is considered to be relevant information, and should not be considered as a statistical fluctuation just because its neighboring pixels are all white). People skilled in the art can easily understand how to apply the same methods also to other types of signals.

Methods and embodiments illustrated herein can be used in conjunction with one another and/or with other methods. Many of the preferred embodiments illustrated herein describe techniques and algorithms with the goal of achieving compression, i.e., encoding a suitable rendition of the signal with a minimum quantity of bits. This also is a non-limiting example: other non-limiting embodiments achieve different purposes, such as robust and efficient filtering, signal quality enhancement, image denoising, etc.

Figure 1A:
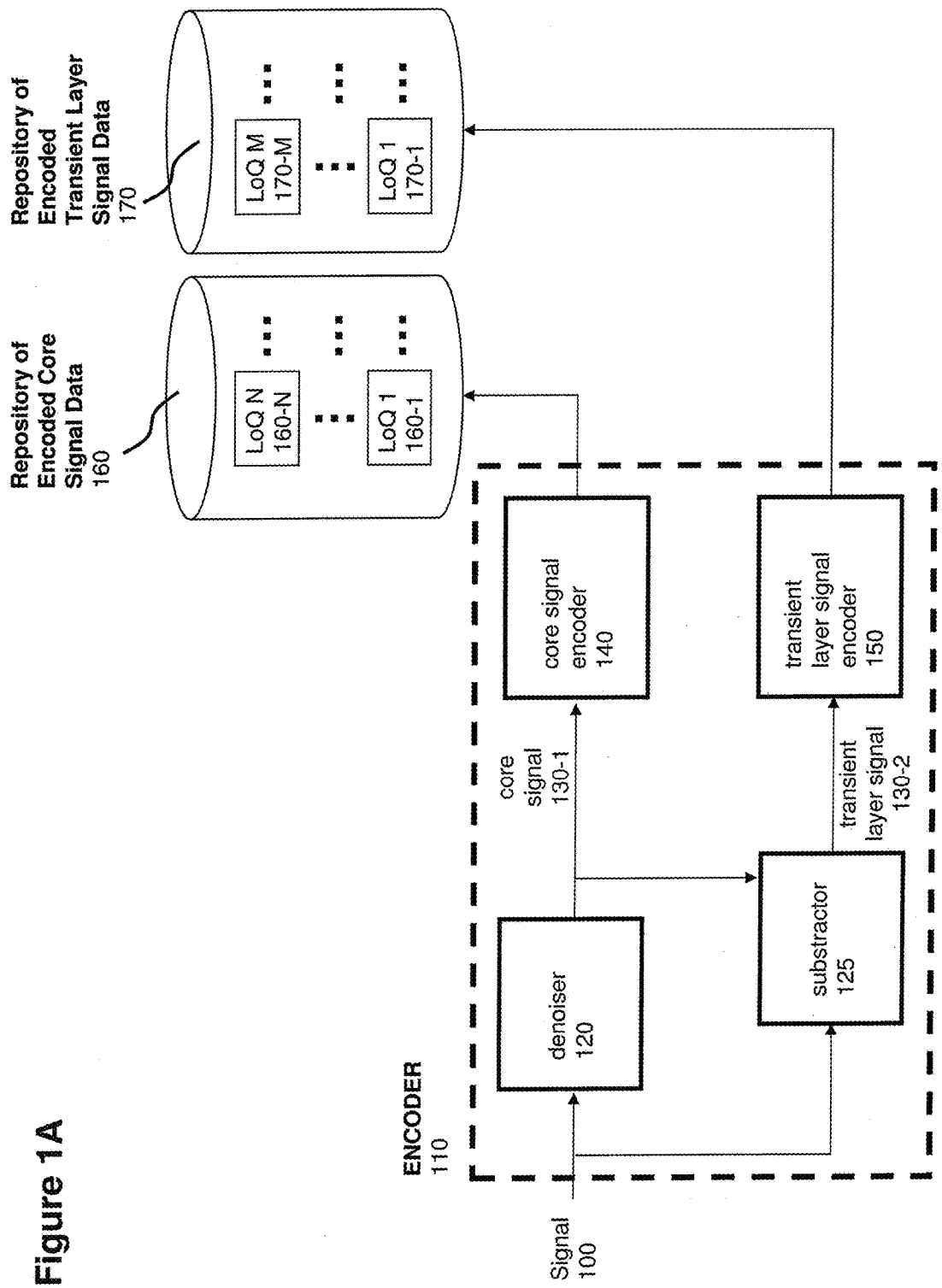
FIG. 1A is an example diagram illustrating an encoder providing reconstruction data according to embodiments of the invention herein.
Figure 1B:
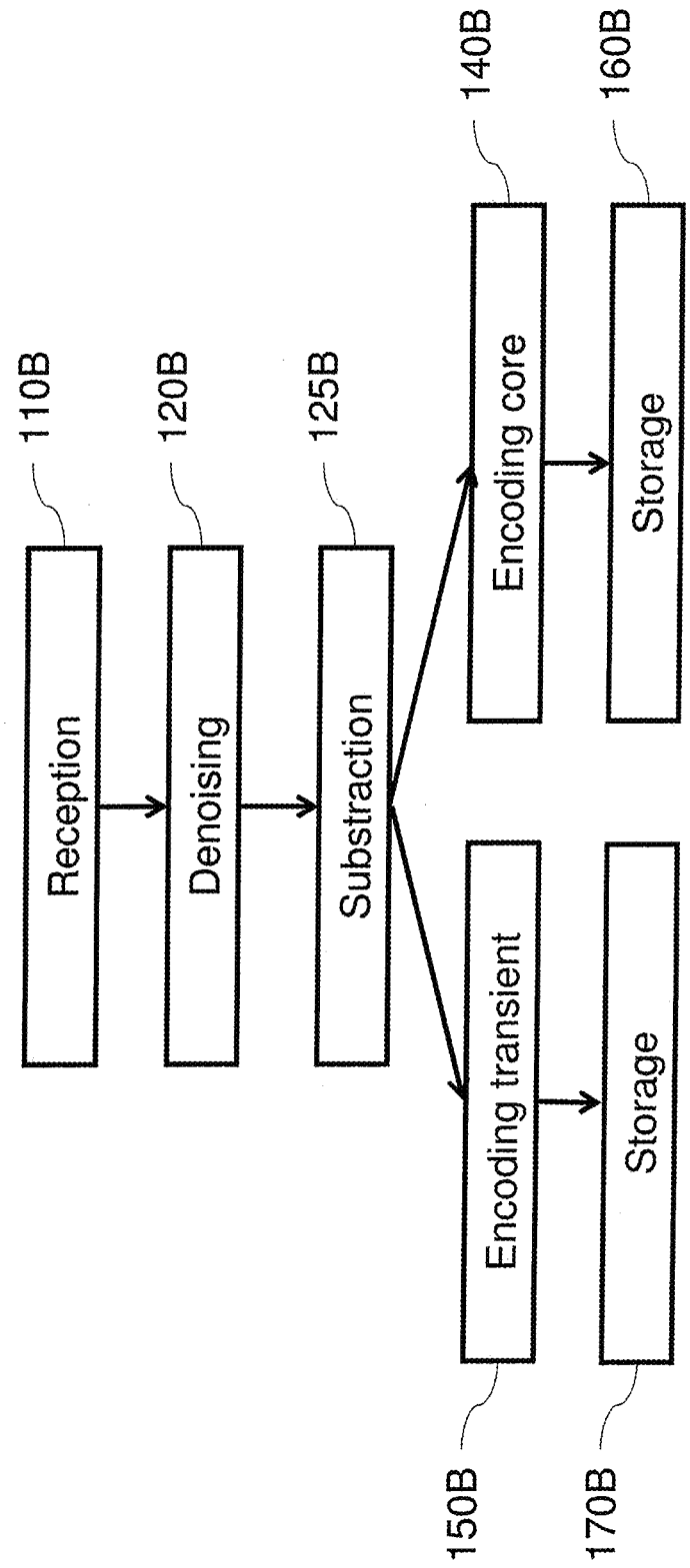
FIG. 1B is a flow chart of the encoding method performed by the encoder illustrated in FIG. 1A.
Figure 2:
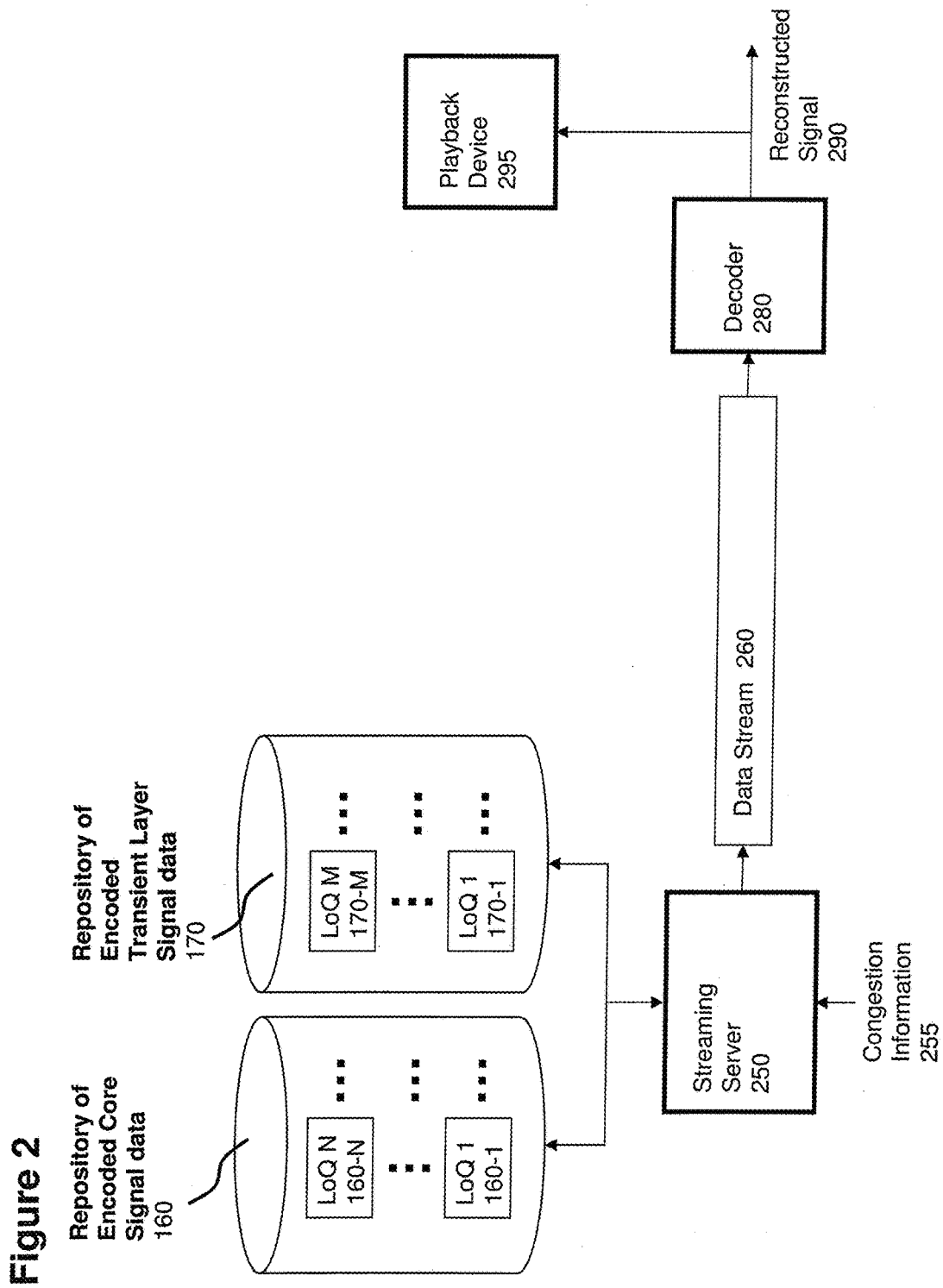
FIG. 2 is an example diagram illustrating generation and transmission of a data stream to a decoder according to embodiments described herein.

FIGS. 1 and 2 illustrate the encoding of a multidimensional signal to be transmitted. This signal supports, for at least one of the dimensions, a stability hypothesis, so that—along such dimension and for a given number of contiguous elements—stable information containing the more relevant information components of the signal ("core signal") can be separated from transient information containing noise and other highly volatile information ("transient layer signal").

In an encoder 110 such as a encoder device, a signal processor device is configured to receive the signal 100 during a step 110B and process it with a denoiser 120 in a step 120B. As its name suggests, the denoiser removes the noise or transients from signal 100 and outputs a core signal 130-1. The denoiser 120 can be implemented with in accordance with any suitable denoising method.

Note that embodiments herein can include analyzing the signal 100 for one or more specific types of noise, transients, etc., in the signal 100. An analyzer resource such as denoiser 120 or other suitable resource can be configured to produce the core signal 130-1 to include original information as in signal less the specific one or more specific classes of transients, noise, etc., that are removed from the signal 100 to produce core signal 130-1. The processing resource such as subtractor or other suitable resource produces the transient signal layer 130-2 to include the one or more classes of transients, noise, etc. Accordingly, embodiments herein can include targeting a specific type of transients, noise, etc., in the original signal 100 and including such information in the transient signal 130-2. The substitute transient signal component as discussed herein can be generated based on the original transient signal 130-2.

In a step 125B, the core signal 130-1 is subtracted from the signal 100 by a subtractor 125, resulting in an output of the transient layer signal 130-2 (e.g., including noise, transients, etc.). As described above, the core signal 130-1 and transient layer signal 130-2 feature different characteristics and properties. In the example described, in one embodiment, the transient layer signal 130-2 behaves like white noise, i.e., each element of transient layer signal 130-2 at a given instance at T=t features stochastic characteristics with an expected value of zero, and not correlated with any corresponding values at precedent or subsequent samples of the signal across the dimension T.

In a step 140B, the core signal 130-1 is encoded by means of a core signal encoder 140, while in a step 150B, the transient layer signal 130-2 is encoded by means of a transient layer signal encoder 150. The encoders 140 and 150 generate encoded core signal data 160 and encoded transient layer signal data 170, collectively referred as "encoded reconstruction data".

In the example described, distinct encoding methods can be used for encoding the core signal 130-1, which is to be reconstructed with high fidelity since it contains essential information, and the transient layer signal 130-2, which is generally not required to be reconstructed with high fidelity, but only with statistical resemblance with the original.

In steps 160B and 170B, the sets of encoded reconstruction data are stored in repositories 160 and 170.

In the non-limiting embodiment described, encoders 140 and 150 produce encoded reconstruction data (e.g., reconstruction data 160-1, . . . , reconstruction data 160-N for core signal 130-1; and reconstruction data 170-1, . . . , reconstruction data 170-N for transient signal 130-2) allowing reconstruction of the different signals at different levels of quality in terms of both signal resolution and adherence to the original signal.

In a particular non-limiting example embodiment, as the core signal and transient layer signal are encoded separately, those signals can be encoded with different hierarchies of levels of quality. As illustrated in FIG. 1, the core signal is encoded with N levels of quality, while the transient layer signal is encoded with M levels of quality.

In another non-limiting embodiment, the transient layer signal encoder 150 encodes the transient layer signal 130-2 with both conventional signal encoding techniques (i.e., encoding the signal " ", for an accurate reconstruction of the transient layer), and encoding techniques that involve extracting and encoding the key statistical characteristics (e.g., spectral distributions, etc.) of the transient layer, so that it is possible to transmit to the decoder a limited amount of encoded data that still allows for reconstruction of a transient layer with similar, while not necessarily identical, characteristics as those of the original transient layer. In other words, the transient information in a received signal 100 can be identified and characterized. In the non-limiting example wherein transient information corresponds to noise information or other particular type of one or more transients that are to be removed, when reproducing a rendition of the signal 100, it is not necessary to use the exact, original noise (e.g., transient signal 130-2, which would require much bandwidth to capture) in the reproduced signal because the noise is extraneous to the extent that it provides effect and is not critical.

Note that the signal information stored in transient layer signal data 170 represents the original transients or noise in signal 100 encoded at different levels of quality and/or represents a substitute for the original noise encoded at different levels of quality.

In one embodiment, the encoder 110 analyzes the original transient signal component in received signal 100 to determine an amount of transient present in the received signal 100. The encoder 110 generates a substitute noise or transient signal component for use in lieu of the original transient signal component. The substitute transient signal component can have a substantially similar amount of transients or noise as the amount of transients or noise present in the received signal 100.

According to embodiments herein, depending on parameters such as the availability of bandwidth, or the target fidelity of the transmitted rendition, a signal processor configured as a streaming server can choose whether to transmit the transient layer with precise fidelity (at the cost of a higher amount of transmitted information) or just with statistical fidelity (i.e., reducing the adherence of the reconstruction with the original signal, but also reducing the amount of information to be transmitted). Thus, if bandwidth is available, embodiments herein can include transmitting the original signal including the original transients for playback. Transmitting a signal including the original transient can require substantial bandwidth, even though the exact transients are not critical to the playback. When less bandwidth is available to transmit data to a target recipient, the substitute transient information (i.e., having statistical characteristics of the original noise) can be transmitted to the target recipient in lieu of transmitting the original transient information that requires substantial extra bandwidth.

In one non-limiting example embodiment, statistical characteristics of transient information identified in a signal can be identified and encoded as substitute transient information according to a tier-based hierarchical encoded method, such as the ones described in U.S. patent application Ser. No. 13/188,188 entitled "INHERITANCE IN A TIERED SIGNAL QUALITY HIERARCHY," Ser. No. 13/188,201 entitled "TIERED SIGNAL DECODING AND SIGNAL RECONSTRUCTION,", Ser. No. 13/188,207 entitled "SIGNAL PROCESSING AND TIERED SIGNAL ENCODING, ", and Ser. No. 13/188,226 entitled "SIGNAL PROCESSING AND INHERITANCE IN A TIERED SIGNAL QUALITY HIERARCHY," from the same inventors. In one of such non-limiting embodiments, the plane of parameters corresponding to statistical characteristics of transient information (identifying a set of parameters per each element of the signal) is encoded with a tiered-based hierarchical method, allowing to efficiently characterize different portions of the signal with different parameters (i.e., different statistical characteristic of transient information).

In accordance with another embodiment, the encoder 110 can receive signal 100. The encoder 110 can be configured to parse the signal 100 into multiple components including a transient (e.g., without limitation, noise) signal component (such as signal 130-2) and a core (e.g., without limitation, non-noise) signal component (such as core signal 130-1). By way of a non-limiting example, the encoder encodes the transient signal component independently of encoding the core signal component and stores the encoded core signal component and the encoded transient signal component in one or more repositories.

The encoder can encode the original core signal component of the signal at multiple levels of playback quality, while also encoding the original transient signal component at multiple levels of playback quality.

As discussed later in FIG. 2, in response to receiving a request for content as represented by signal 100, a respective server resource adaptively transmits the encoded original core signal component and the encoded original transient signal component at varying levels of quality over a respective communication link to a remote decoder.

One embodiment herein can include detecting a reduction in available bandwidth on the communication link. There may be insufficient bandwidth to transmit the core signal and the transient signal at the highest level of quality. In response to such a condition, the server resource can be configured to maintain a transmission of the encoded core signal component at a particular level of quality and reduce a level of quality at which the original or substitute transient signal component is transmitted to the decoder device over the communication link to accommodate the reduction in available bandwidth.

In other words, embodiments herein can include transmitting appropriate encoded signal data (associated with signal 100) to reproduce a best playback experience at a target device. Embodiments herein can further include reducing a level of quality of original or substitute transient information to the target device in response to detecting congestion. Thus, bandwidth saved from reducing a quality of the transient information (which may have little impact on a played back version of content) can be used to send encoded data such as a larger portion or high quality of compressed core portion of the signal 100.

Referring again to FIG. 1, in accordance with yet further embodiments, the encoder can be configured to receive signal 100 and parse the signal 100 into multiple components including an original transient signal component (such as signal 130-2) and an original core signal component (such as signal 130-1). The encoder 110 converts the original transient signal component into a substitute transient signal component. The substitute transient signal component is representative of but not identical to transient information in the received signal. The encoder 110 provides such as stores the substitute transient signal component as a replacement for the original noise signal component. In one embodiment, the encoder 110 produces the substitute transient signal component at different levels of quality.

In one embodiment, the encoder 110 generates the substitute transient signal component to have a substantially similar distribution of information as a distribution of information in the original transient signal component. In yet further embodiments, the encoder 110 produces the produces the substitute transient signal component associated with signal 100 to be substantially fewer bits of data than the original transient signal component.

The encoder 110 can be configured to generate the substitute transient signal component to be perceptibly equivalent to the original transient signal component. That is, playback of the core signal component and the substitute transient component can be perceptibly the same or substantially similar to a respective viewing experience when playing back the core signal component and the original transient signal component. However, as mentioned, the substitute transient component may be captured in substantially fewer bits than are needed to capture the original transient signal component in the original signal 100.

Further embodiments herein include: encoding the substitute transient signal component; storing the encoded substitute transient signal component in a repository; compressing the original core signal component; storing the compressed original core signal component of the received signal in the repository; and distributing the encoded substitute transient signal component and the compressed original core signal for playback. In accordance with further embodiments, note that the signal 100 can include different types of transient information. It may be desirable to remove one or more of these types of transients from the original signal 100. Embodiments herein can include parsing the signal 100 into a core signal 130-1 as well as multiple types of target transient signals. Each of the multiple transient signals can be used to represent different types of transients in the original signal 100. In a similar manner as previously discussed, a substitute transient signal can be generated for each of the different types of transients detected in the original signal 100. Additionally, each type of transient can be encoded at different levels of quality. FIG. 2 illustrates the transmission of a signal encoded according to the invention. Repositories 160 and 170 are accessed and data is extracted and processed by a streaming server 250 comprising for example, a signal processor. The streaming server 250 assembles and transmits a data stream 260 to a remote decoder 280 (such as a decoder device located over a network at a remote location), which then reconstructs a rendition of a reconstructed signal 290 and sends it to a playback device 295 for playback.

By way of a non-limiting example, in one embodiment, the streaming server 250 assembles the data stream 260 by combining the encoded core signal data and encoded transient layer signal data into a one single data stream.

In the non-limiting example embodiment described herein, the streaming server 250 also receives information 255 representative of data traffic conditions of a transmission channel to the decoder 280. Based on the traffic conditions such as congestion of a communication link supporting conveyance of the digital data stream transmitted to the decoder at a remote location, the streaming server 250 is configured to select the different data to assemble the data stream 260.

More precisely, in this embodiment, the streaming server 250 can be configured to assign different priorities to the encoded core signal data in the repository 160 and to the encoded transient layer signal data in the repository 170. This allows the streaming server 250 to combine, for example, a relatively higher level of quality of the core signal with a relatively lower level of quality of the transient layer signal. In certain instances, it is desired to transmit encoded data representing the core signal at a high level of quality as it is typically the most important part of the original signal 100. As mentioned, in response to detecting congestion, the transient layer signal or substitute for same can be transmitted at a lower level of quality.

In case of reconstruction data encoded according to a tier-based or to a multi-scale method, encoded core signal data 160-1 through 160-N are transmitted along with only encoded transient layer data 170-1, or in case of reconstruction data encoded according to a conventional encoding method, encoded core signal data 160-N can be transmitted along with the encoded transient layer data instead. In principle, modulating the levels of quality of the core signal differently from the levels of quality of the transient layer allows for a less perceptible degradation of the overall quality of the reconstructed signal 290 when the streaming server 250 is forced to reduce the size/bitstream of the data stream 260. The degradation of the signal can be more progressive and provide a smoother viewing experience to the user.

In accordance with further embodiments, sending the detected transient layer signal 130-2 at the lower level of quality in favor of transmitting a high level of quality for the core signal 130-1 provides a better viewing experience during congestion.

Figure 3A:
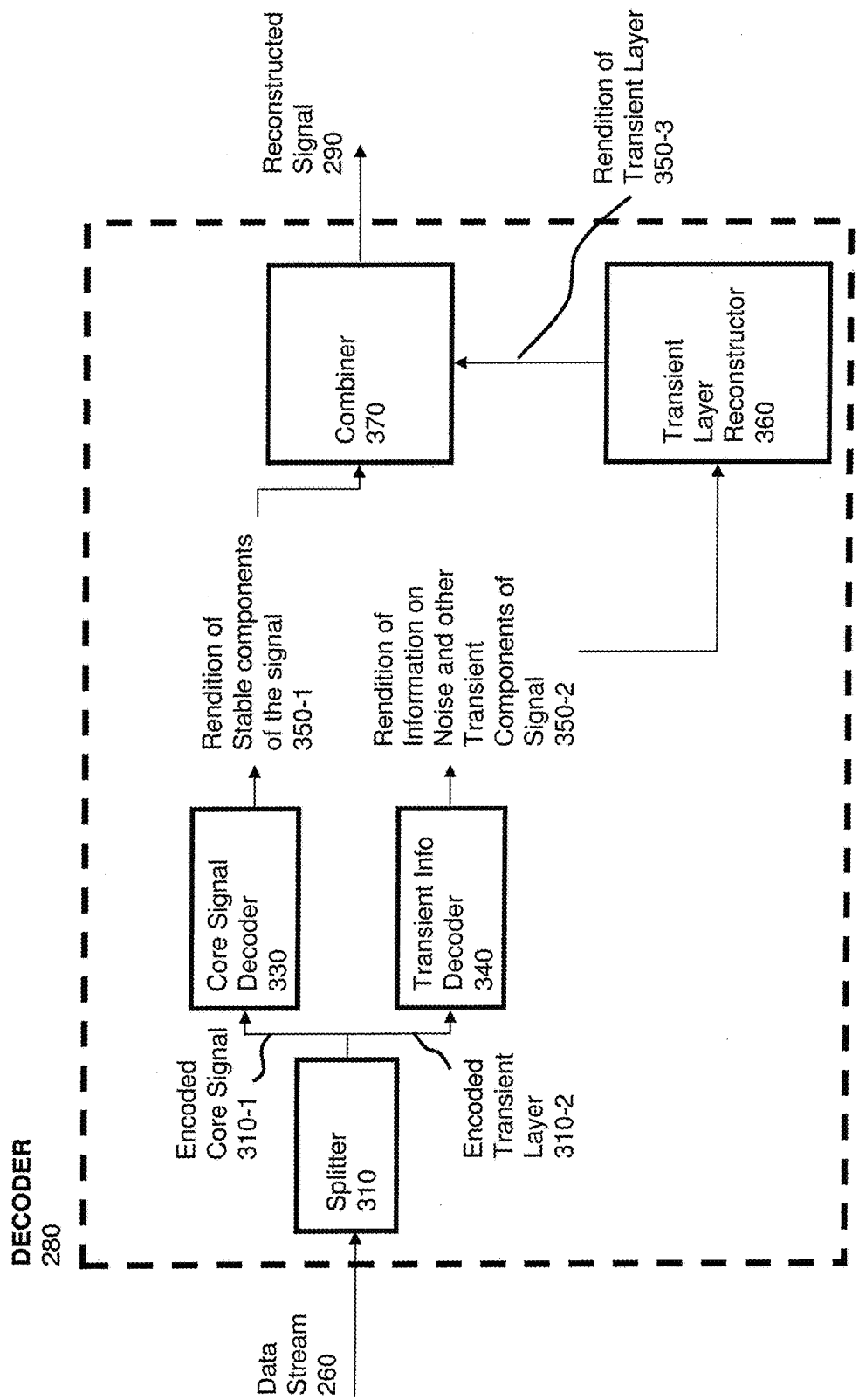
FIG. 3A is an example diagram illustrating decoding of a data stream containing both encoded core signal data and encoded transient layer signal data according to embodiments described herein.
Figure 3B:
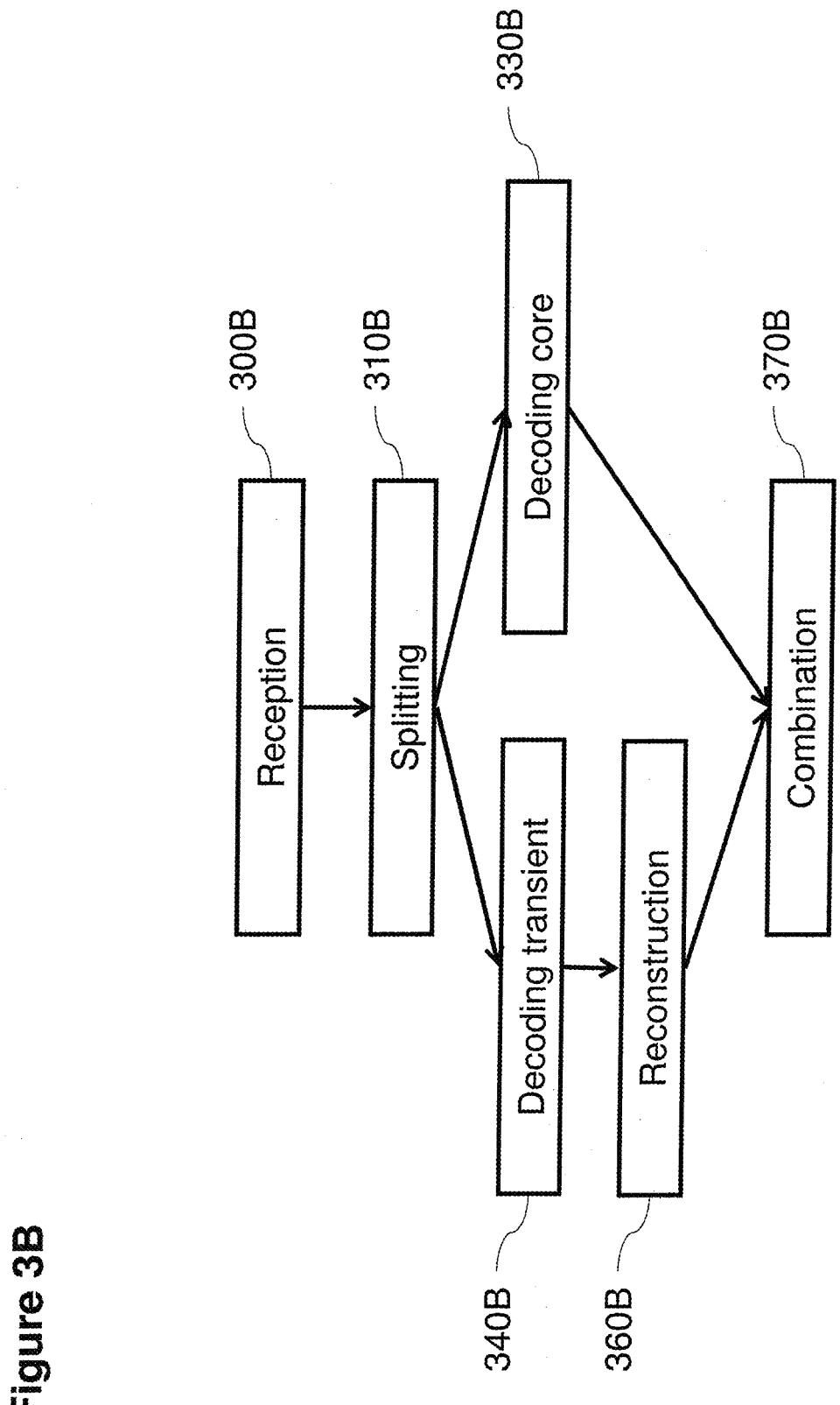
FIG. 3B is a flow chart of the decoding method performed by the decoder illustrated in FIG. 3A.

FIGS. 3A and 3B illustrate the decoding of data stream 260 containing both the encoded core signal data and encoded transient layer signal data.

By way of a non-limiting example, the data stream 260 can be received as a single stream of data including the core signal information and the transient layer information. The data stream 260 is received in a step 300B by the decoder 280, said decoder producing the reconstructed signal 290 as previously discussed.

In the example described, in a step 310B, the data stream 260 is split by a splitter 310 into two different sets of data: namely, an encoded core signal 310-1 and an encoded transient layer signal 310-2.

Each set of data (i.e., core signal 310-1 and transient layer signal 310-2) is then decoded independently in accordance with specific requirements of their respective encoding methods. In the specific embodiment illustrated in FIGS. 3A and 3B, in a step 330B the encoded core signal 310-1 is decoded by a core signal decoder 330, producing a rendition of stable components of the signal 350-1 (such as core information without noise). In step 340B, the encoded transient layer signal 310-2 is decoded by a transient layer signal decoder 340, producing a rendition of information of noise and other transient components of signal 350-2.

The rendition of information 350-2 is sent to a transient layer reconstructor 360, which produces in a step 360B a rendition of the transient layer signal 350-3. Renditions 350-1 and 350-3 are combined by a combiner 370 during a step 370B to generate the reconstructed signal 290.

In one embodiment, the renditions 350-1 and 350-3 have different resolutions and the combination comprises resampling the renditions to obtain renditions of the same resolution and summing them element by element. Typically, the renditions of lower resolution are upsampled so that all renditions have the same resolution.

In another embodiment, the rendition of information of noise and other transient components of signal 350-2 can contain parameters indicating spectral distribution properties of the original transient layer signal 130-2. In this case, the encoded data does not contain information for accurate reconstruction of the transient layer signal 130-2, but information for reconstruction of a proxy of the transient layer signal 130-2. Accordingly, the transient layer reconstructor 360 generates a rendition of the transient layer signal 350-3 with spectral distribution properties that are substantially similar to the properties of the original transient layer signal 130-2.

Figure 4:
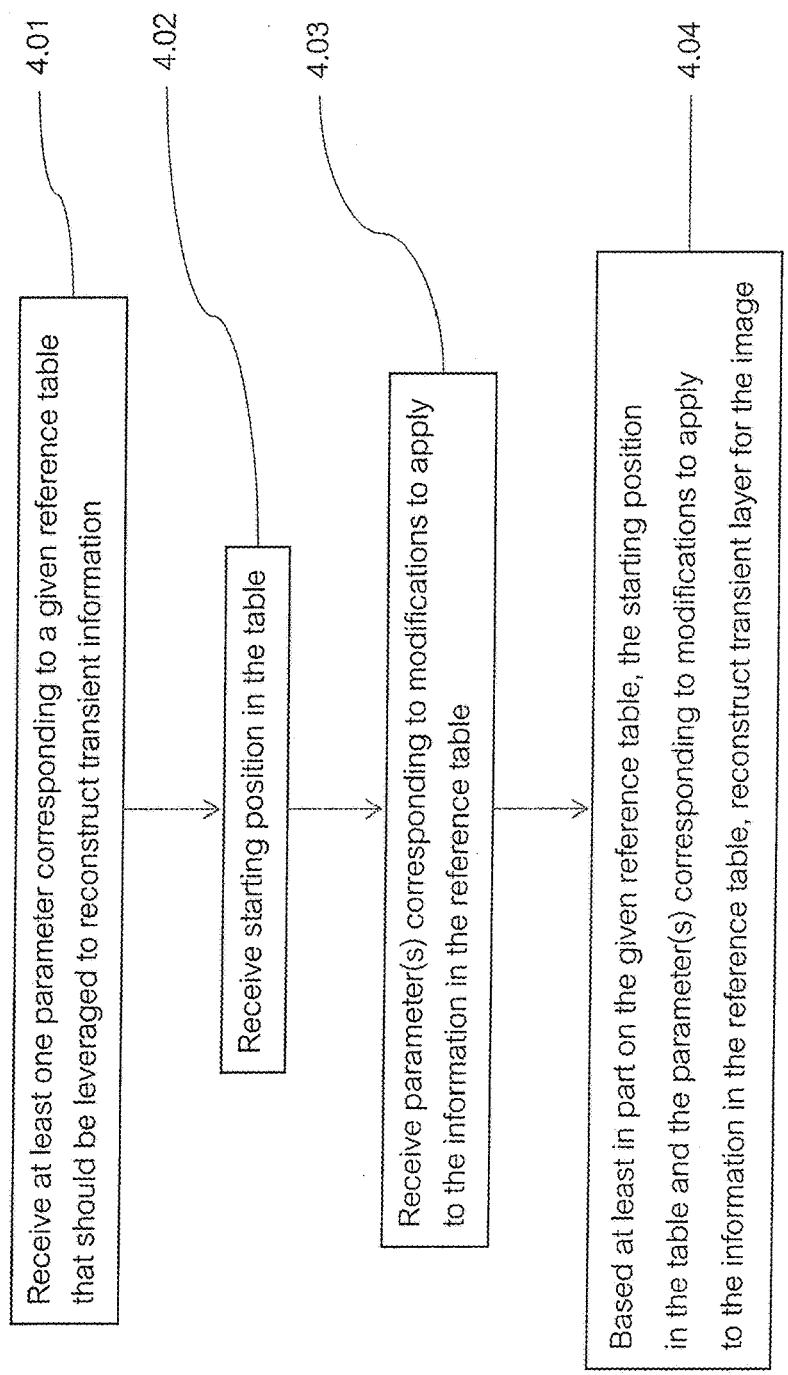
FIG. 4 is a flow chart of the decoding and reconstruction of a transient layer according to information known at both the encoding and the decoding side.

FIG. 4 illustrates a non-limiting embodiment of reconstruction of a transient layer according to information known at both the encoding and the decoding side.

In step 4.01, the decoder receives one or more parameters corresponding to a reference table that should be leveraged in order to generate the values of the elements of the transient layer. Broadly speaking, said reference table corresponds to the statistical properties of the transient layer (e.g., by ways of non-limiting example, featuring values distributed according to a Laplacian distribution), and allows to generate seemingly random numbers according to a said statistical properties. In this non-limiting embodiment, the same reference table is available at both encoding and decoding, allowing the encoder to generate precisely the same seemingly random numbers that will be generated by the decoder, thus precisely simulating the decoding process of the transient layer.

In step 4.02, the decoder receives a parameter indicating the starting position in said table, i.e., the position in the sequence of numbers contained in the table from which to start in order to generate seemingly random numbers according to the statistical properties corresponding to said table. In this non-limiting embodiment, the decoder calculates the starting position based on information that is known at both encoding and decoding (e.g., specific properties of the image), without the need for the encoder to send to the decoder a starting position.

In step 4.03, the decoder receives at least one parameter corresponding to alterations to perform to the numbers generated by means of the reference table. In this non-limiting embodiment, said parameters include a scaling parameter for the Y component (luminance) and a scaling parameter for the U and V components.

In step 4.04, the decoder generates the elements of the transient layer, by selecting values in the sequence of values of said reference table (starting from said starting location) and by altering them according to said parameters.

In other non-limiting embodiments, the decoder receives different parameters for different portions of the signal, thus generating values for each given element of the transient layer by selecting different reference tables and/or altering numbers of the reference tables in different ways according to the location of said given element in the transient layer. In some of such non-limiting embodiment, the decoder receives an auxiliary map of parameters at a lower level of quality, upscales it to the level of quality of the transient layer that must be reconstructed (thus generating parameters for each element of the transient layer that must be reconstructed), and then generates the values of each given element of the transient layer according to the corresponding parameters of said given element.

In another non-limiting embodiment, in order to generate a transient layer corresponding to a given core signal, the decoder selects the reference table and generates suitable parameters to alter values of the reference table based at least in part on one or more quantization parameters used to decode the core signal corresponding to said transient layer.

In another non-limiting embodiment, the decoder generates a plurality of transient layers corresponding to a same core signal and then combines them in order to reconstruct a single transient layer corresponding to said core signal.

Figure 5:
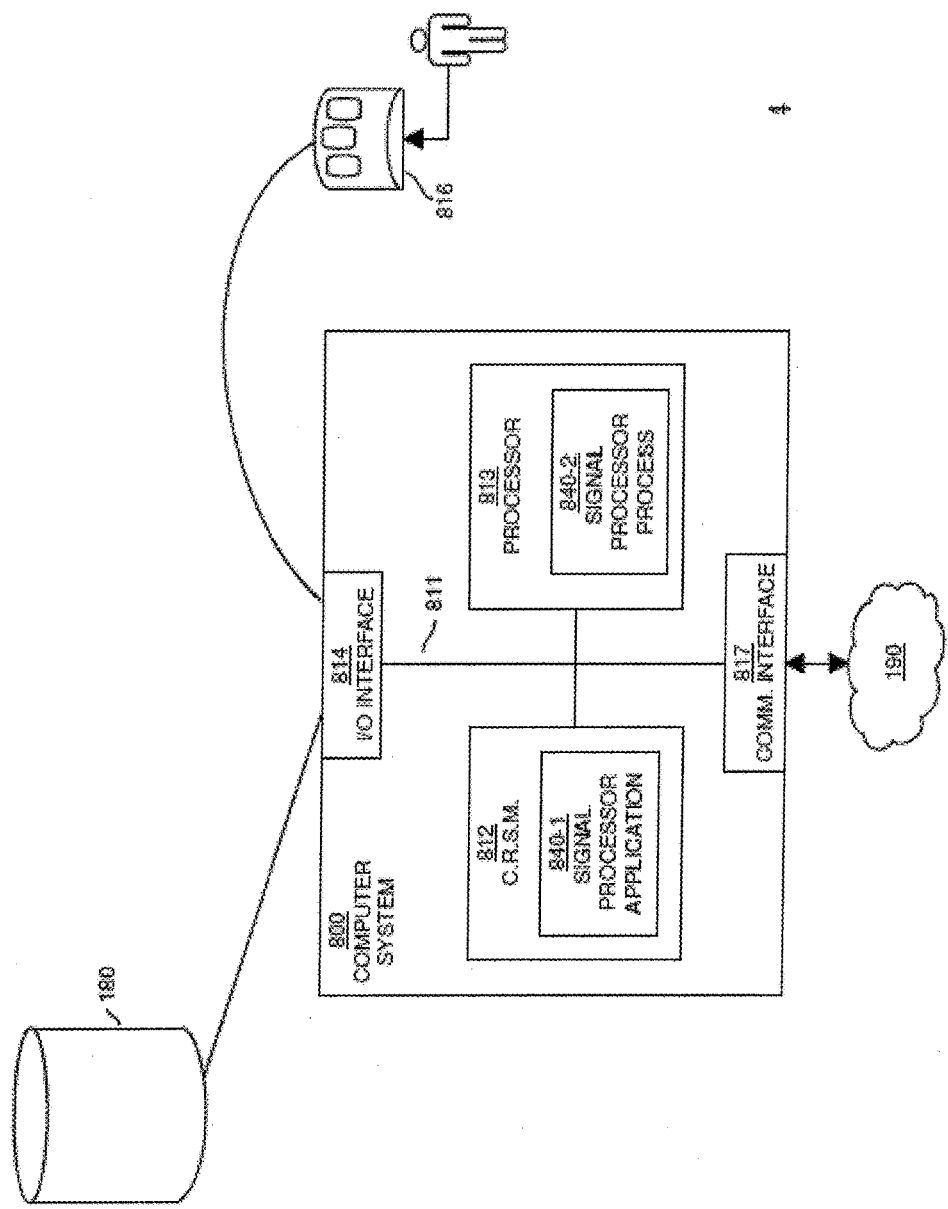
FIG. 5 is a diagram illustrating an instance of computer architecture for executing computer codes, instructions, applications, software and/or firmware, etc., according to embodiments described herein.

FIG. 5 is an example block diagram of a computer system 800 that implements signal processing such as decoding and/or decoding according to embodiments described herein.

Unless specifically stated otherwise, as apparent from the following discussion, it is appreciated that throughout this specification discussions utilizing terms such as "processing", "computing", "calculating", "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

In accordance with different embodiments described herein, the computer system 800 may be any of various types of devices, including, but not limited to, a personal computer system, desktop computer, laptop, notebook, netbook computer, mainframe computer system, handheld computer, tablet, smartphone, workstation, network computer, application server, storage device, a consumer electronics device such as a camera, camcorder, set top box, mobile device, video game console, handheld video game device, a peripheral device such as a switch, modem, router, or, in general, any type of computing or electronic device.

As shown in the figure, the computer system 800 of the present example includes an interconnect 811 that couples with a computer readable storage medium 812, in which digital information can be stored and retrieved. Computer system 800 can further include a processor 813 (e.g., one or more processor devices), I/O interface 814, and a communications interface 817.

The I/O interface 814 provides connectivity to a repository 180, and if present, display screen and peripheral devices 816 such as a keyboard, and/or a computer mouse, etc.

Communications interface 817 enables the computer system 800 to communicate over network 190 to retrieve information from remote sources and communicate with other computers, switches, clients, servers, etc. The I/O interface 814 also enables the signal processor 813 to retrieve or attempt to retrieve stored information from the repository 180.

Note that the computer system 800 or encoder 110 or streaming server 250 or decoder 280 also can be embodied to include a computer readable storage medium 812 for storing data and/or logic instructions.

Said computer readable storage media 812 can be any suitable device and/or hardware such as memory, optical storage, hard drive, floppy disk, etc. The computer readable storage media can also be a non-transitory storage media to store instructions associated with any of signal processors 110, 250 and/or 280. The instructions are executed by a respective resource such as the signal processor 813 to perform any of the operations as discussed herein. As shown, the computer readable storage media 812 can be encoded with a signal processor application 840-1 executed by a signal processor 813 while processing 840-2.

The computer system 800 can include the signal processor 813 to execute such instructions and carry out operations as discussed herein. Accordingly, when executed, the code associated with a signal processor application 840-1 can support processing functionality as discussed herein. As mentioned, the signal processor 813 can be configured to support encoding and/or decoding. In a non-limiting embodiment, the signal processor 813 accesses computer readable storage media 812 via the use of interconnect 811 in order to launch, run, execute, interpret or otherwise perform the instructions of the signal processor application 840-1 stored in computer readable storage media 812. Execution of the signal processor application 840-1 produces processing functionality in the signal processor 813. In other words, the process 840-2 associated with processor 813 represents one or more aspects of executing the signal processor application 840-1 within or upon the signal processor 813 in the computer system 800.

Note that the above discussion provides a basic embodiment indicating how to carry out functionality associated with signal processor 813. However, it should be noted that the actual configuration for carrying out the operations as described herein can vary depending on the applications.

Those skilled in the art will understand that the computer system 800 can include other processes and/or software and hardware components, such as an operating system that controls allocation and use of hardware processing resources to execute signal processor application 840-1.

Figure 6:
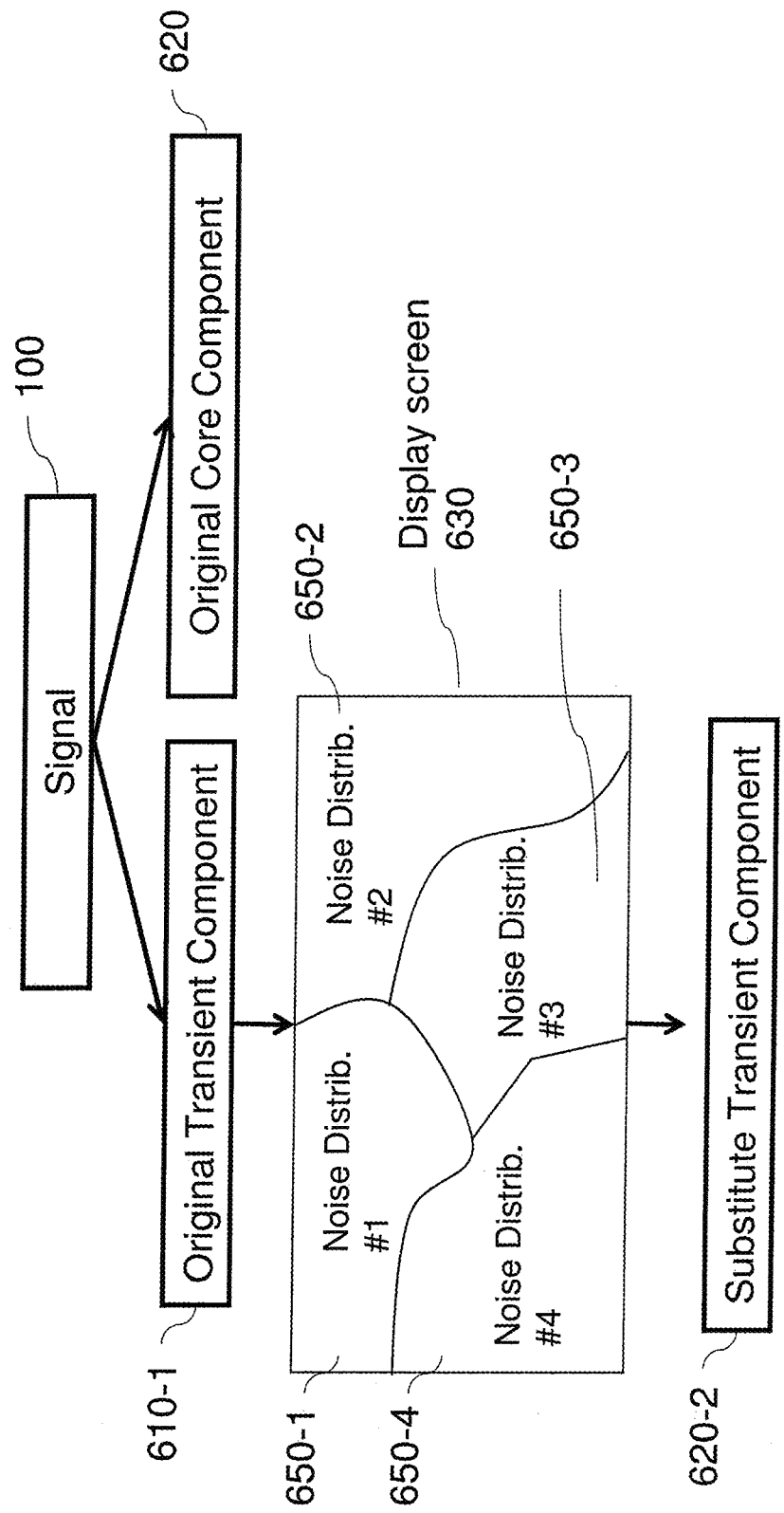
FIG. 6 is an example diagram illustrating different distributions of noise or transients in an image of a signal according to embodiments herein.

FIG. 6 is an example diagram illustrating different distributions of transient information (e.g., without limitation, such as or including noise) in an image of a signal according to embodiments herein.

As previously discussed, a suitable processing resource such as encoder 110 processes and parses signal 100 into an original transient signal component 610-1 (e.g., information that can suitably be transmitted statistically, such as without limitation noise) and an original core signal component 620 (e.g., relevant information that should be transmitted with fidelity to the original).

The signal 100 can be a time-based display signal playable over time on a display screen 630. For example, the signal 100 can specify settings of each element ("pixel") on display screen 630 over time.

The processing resource converts the original noise signal component 610-1 into the substitute transient signal component 620-2. This can include: for a portion of the original transient signal corresponding to a frame of display information to be displayed on the display screen 630, analyzing the portion of the original transient signal component 610-1 to identify different levels of transient information present in multiple regions of the display screen. For example, the processing resource detects that region 650-1 has a corresponding noise distribution #1; the processing resource detects that region 650-2 has a corresponding noise distribution #3; the processing resource detects that region 650-3 has a corresponding noise distribution #2; and so on. Each region can have a different level of noise.

Based on the amount of detected noise in the regions 650, the processing resource produces the substitute transient signal component 620-2 to reflect or specify substitute distributions of noise to be used in the multiple different regions.

Figure 7:
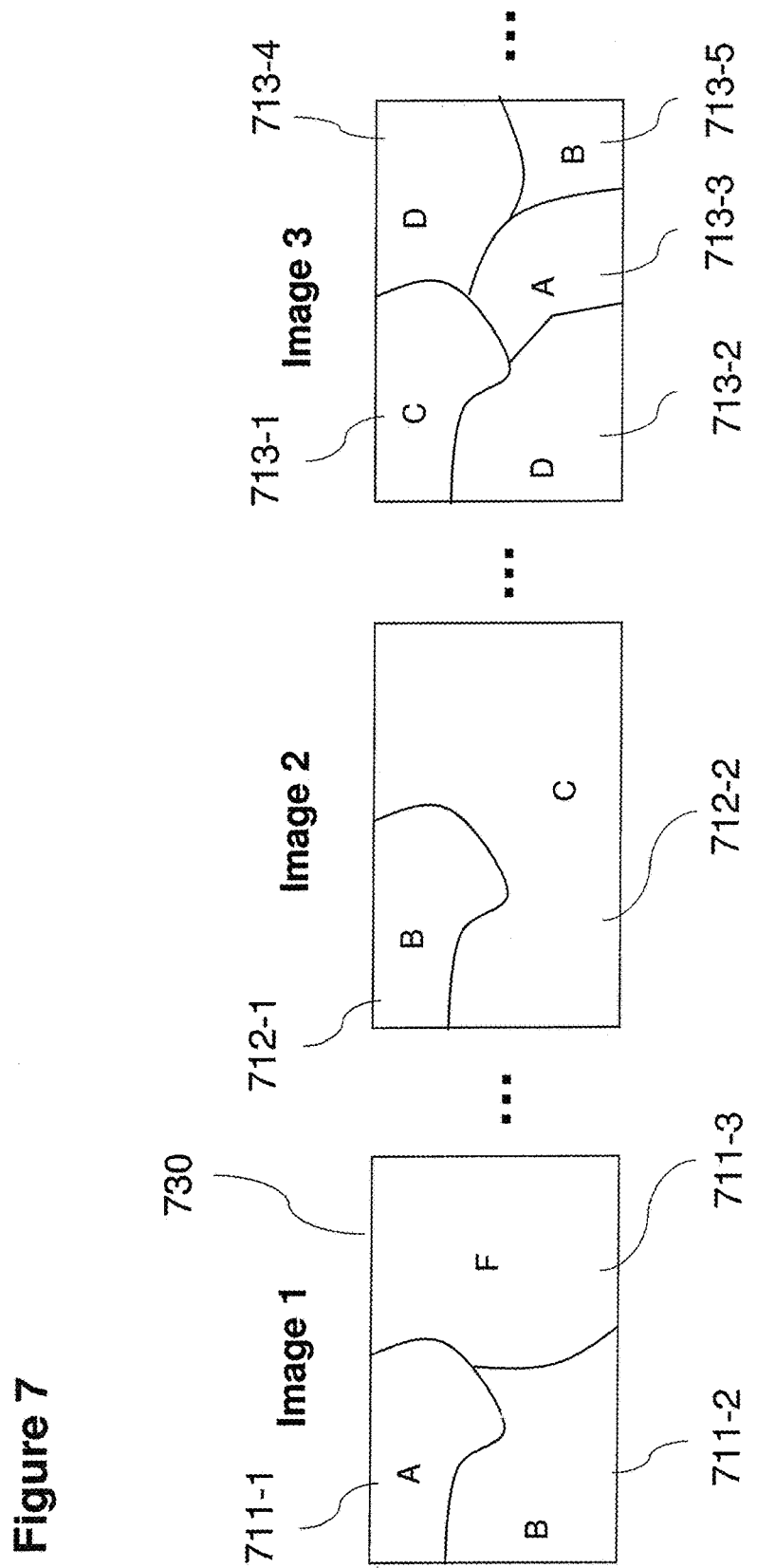
FIG. 7 is an example diagram illustrating changes in the distribution of noise or transients in different regions of a display screen over time according to embodiments herein.

FIG. 7 is an example diagram illustrating changes in the distribution of transient information in different regions of a display screen over time according to embodiments herein.

As previously mentioned, the signal 100 can be a time-based signal (such as a sequence of playable images and/or audio). The amount of transient information (without limitation, noise) in the different regions can vary over time. In one embodiment, the processing resource analyzes the different regions and determines an amount of transient information present in the signal 100.

For example, processing resource such as encoder 110 analyzes settings in the original transient signal component 620-1 in the field of pixels 730 for image 1 and determines level of transient information A present in region 711-1; level of transient information B present in region 711-2; level of transient information F present in region 711-3. The processing resource produces the substitute transient signal component 620-2 for image 1 to reflect these detected amounts of transient information.

Processing resource such as encoder 110 analyzes settings in the original transient signal component 620-1 in the plane of pixels for image 2 and determines level of transient information B present in region 712-1 and level of transient information C present in region 712-2. The processing resource produces the substitute transient signal component 620-2 for image 2 to reflect these detected amounts of transient information.

Processing resource such as encoder 110 analyzes settings in the original transient signal component 620-1 in the plane of pixels for image 3 and determines level of transient information C present in region 713-1; level of transient information D present in region 713-2; level of transient information A present in region 711-3; level of transient information D present in region 713-4; and level of transient information B present in region 713-5. The processing resource produces the substitute transient signal component 620-2 for image 3 to reflect these detected amounts of transient information.

As previously discussed, processing can include identifying one or more different target types of transients present in the original signal 100, analyzing the transients, and the producing a substantially similar substitute for the transients.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware, performing operations of:
retrieving a transient image signal component and a core image signal component from storage, the transient image signal component being encoded at a first set of multiple different bit rates, the transient image signal component being encoded independently of encoding the core image signal component, the encoded transient image signal component at the first set of multiple different bit rates supporting multiple levels of playback quality and the core image signal component being encoded at a second set of multiple different bit rates, the core image signal component being encoded independently of encoding the transient image signal component, the encoded core image signal component at the second set of multiple different bit rates supporting multiple levels of playback quality;
combining the transient image signal component and the core image signal component together to generate a single data stream for transmission to a target recipient;
transmitting, over a communication link, the single data stream to the target recipient;
during transmission of the single data stream to the target recipient, modulating a level of quality of the core image signal component included in the single data stream differently than modulating a level of quality of the transient image signal component included in the single data stream;
during the transmission of the single data stream to the target recipient, detecting a reduction in available bandwidth on the communication link; and
in response to detecting the reduction in available bandwidth on the communication link during the transmission of the single data stream, modifying the single data stream by reducing a transmission of the transient image signal component to a reduced level of quality while maintaining a transmission of the core image signal component at the level of quality such that the single data stream is adaptively transmitted over the communication link at varying levels of quality, which levels of quality vary during the transmission.

2. The method as in claim 1, wherein the transient image signal component is a substitute transient signal component, the substitute transient signal component being representative of, but not identical to, original transient information originally associated with the core image signal component.

3. The method as in claim 2, wherein the substitute transient signal component has a distribution of information that shares one or more similarities to a distribution of information of the original transient information.

4. The method as in claim 1, wherein the transient image signal component is encoded with fewer bits than an original image signal component from which the transient image signal component is derived.

5. The method as in claim 1, wherein the transient image signal component encodes different noise distribution levels in each of multiple different regions of a display field.

6. The method as in claim 1, wherein the transient image signal component and the core image signal component are derived from an original image signal, the first set of multiple different bit rates and second set of multiple different bit rates stored in a repository for selective retrieval and inclusion in the data stream.

7. The method as in claim 1 further comprising:
providing higher priority to transmitting the core image signal component than the transient image signal component.

8. The method as in claim 1 further comprising:
modulating the level of quality of the core image signal component differently than the level of quality of the transient image signal component transmitted in the data stream to provide less perceptible degradation of overall quality of an image signal reconstructed from the single data stream.

9. A computer system comprising:
computer processor hardware; and
a hardware storage resource coupled to the computer processor hardware, the hardware storage resource storing instructions that, when executed by the computer processor hardware, cause the computer processor hardware to:
retrieve a transient image signal component and a core image signal component from storage, the transient image signal component being encoded at a first set of multiple different bit rates, the transient image signal component being encoded independently of encoding the core image signal component, the encoded transient image signal component at the first set of multiple different bit rates supporting multiple levels of playback quality and the core image signal component being encoded at a second set of multiple different bit rates, the core image signal component being encoded independently of encoding the transient image signal component, the encoded core image signal component at the second set of multiple different bit rates supporting multiple levels of playback quality;
combine the transient image signal component and the core image signal component together to generate a single data stream for transmission to a target recipient;
transmit, over a communication link, the single data stream to the target recipient;
during transmission of the single data stream to the target recipient, modulate a level of quality of the core image signal component included in the single data stream differently than modulating a level of quality of the transient image signal component included in the single data stream;
during the transmission of the single data stream to the target recipient, detect a reduction in available bandwidth on the communication link; and
in response to detecting the reduction in available bandwidth on the communication link during the transmission of the single data stream, modifying the single data stream by reducing a transmission of the transient image signal component to a reduced level of quality while maintaining a transmission of the core image signal component at the level of quality such that the single data stream is adaptively transmitted over the communication link at varying levels of quality, which levels of quality vary during the transmission.

10. The computer system as in claim 9, wherein the transient image signal component is a substitute transient signal component, the substitute transient signal component being representative of, but not identical to, original transient information originally associated with the core image signal component.

11. The computer system as in claim 10, wherein the substitute transient signal component has a distribution of information that shares one or more similarities to a distribution of information of the original transient information.

12. The computer system as in claim 9, wherein the transient image signal component is encoded with fewer bits than an original image signal component from which the transient image signal component is derived.

13. The computer system as in claim 9, wherein the transient image signal component encodes different noise distribution levels in each of multiple different regions of a display field.

14. The computer system as in claim 9, wherein the transient image signal component and the core image signal component are derived from an original image signal, the first set of multiple different bit rates and second set of multiple different bit rates stored in a repository for selective retrieval and inclusion in the single data stream.

15. The computer system as in claim 9, wherein the computer processor hardware is further operable to:
provide higher priority to transmitting the core image signal component than the transient image signal component.

16. The computer system as in claim 9, wherein the computer processor hardware is further operable to:
modulate the level of quality of the core image signal component differently than the level of quality of the transient image signal component transmitted in the data stream to provide less perceptible degradation of overall quality of an image signal reconstructed from the data stream.

17. The computer system of claim 9, wherein modifying the single data stream during the transmission of the data stream includes reducing a bitstream of the single data stream.

18. Computer-readable hardware storage having instructions stored thereon, the instructions, when carried out by computer processor hardware, cause the computer processor hardware to:
retrieve a transient image signal component and a core image signal component from storage, the transient image signal component being encoded at a first set of multiple different bit rates, the transient image signal component being encoded independently of encoding the core image signal component, the encoded transient image signal component at the first set of multiple different bit rates supporting multiple levels of playback quality and the core image signal component being encoded at a second set of multiple different bit rates, the core image signal component being encoded independently of encoding the transient image signal component, the encoded core image signal component at the second set of multiple different bit rates supporting multiple levels of playback quality;
combine the transient image signal component and the core image signal component together to generate a single data stream for transmission to a target recipient;
transmit, over a communication link, the single data stream to the target recipient;
during transmission of the single data stream to the target recipient, modulate a level of quality of the core image signal component included in the single data stream differently than modulating a level of quality of the transient image signal component included in the single data stream,
during the transmission of the single data stream to the target recipient, detect a reduction in available bandwidth on the communication link; and
in response to detecting the reduction in available bandwidth on the communication link during the transmission of the single data stream, modifying the single data stream by reducing a transmission of the transient image signal component to a reduced level of quality while maintaining a transmission of the core image signal component at the level of quality such that the single data stream is adaptively transmitted over the communication link at varying levels of quality, which levels of quality vary during the transmission.

* * * * *